H. R. RICARDO.
BALANCING OF RECIPROCATING ENGINES.
APPLICATION FILED DEC. 30, 1919.

1,342,648.

Patented June 8, 1920.
8 SHEETS—SHEET 1.

H. R. RICARDO.
BALANCING OF RECIPROCATING ENGINES.
APPLICATION FILED DEC. 30, 1919.

1,342,648.

Patented June 8, 1920.
8 SHEETS—SHEET 2.

Inventor,
H. R. Ricardo,
By Foster, Freeman, Watson & Coit,
Attorneys.

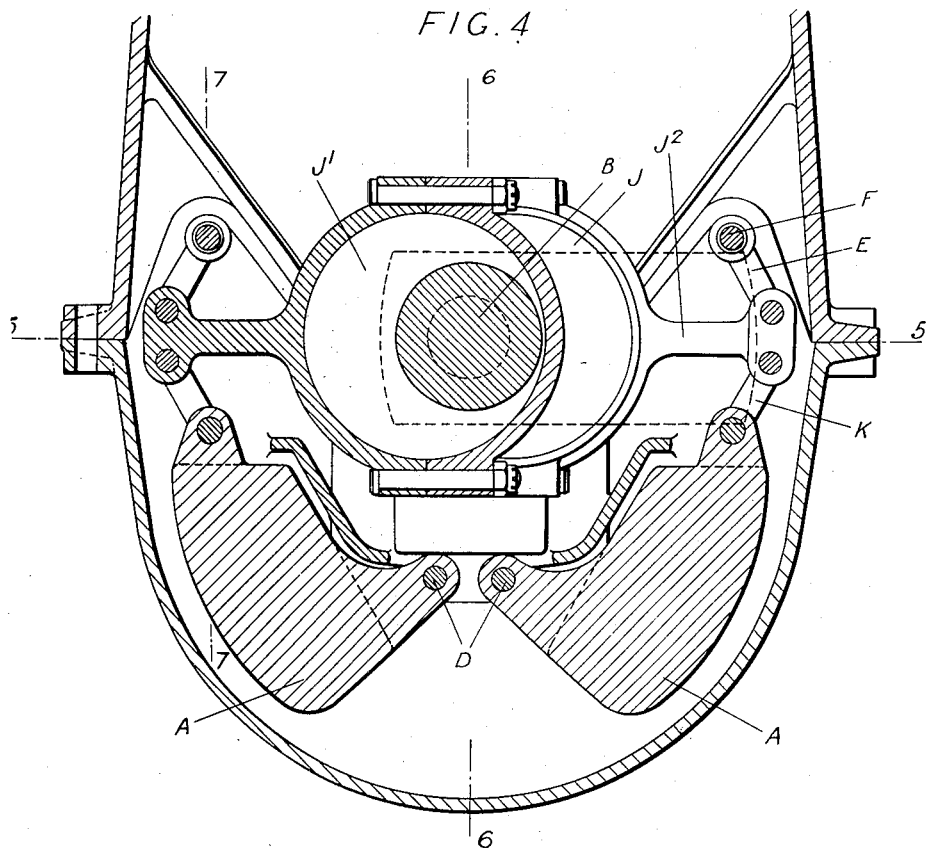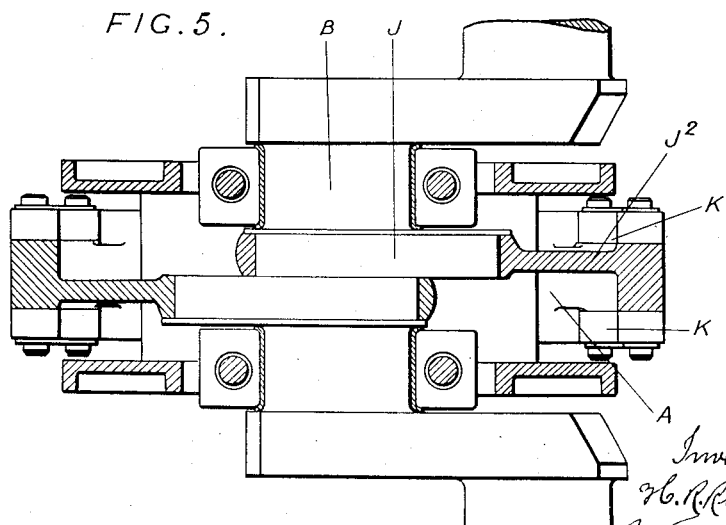

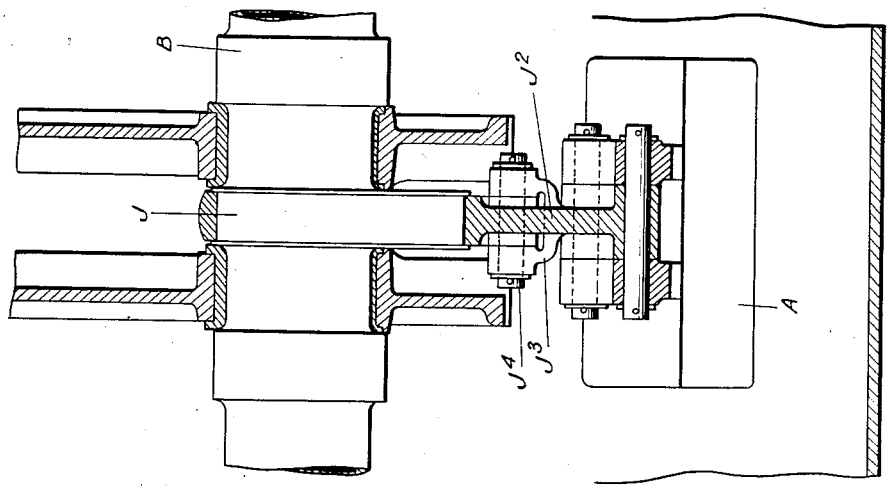
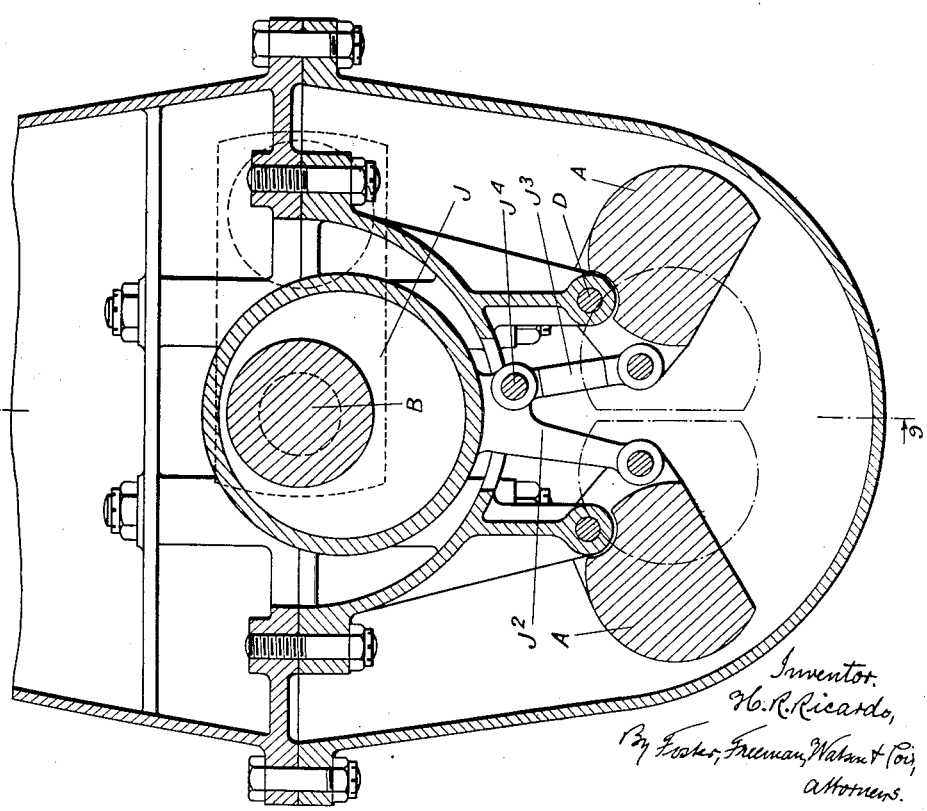

H. R. RICARDO.
BALANCING OF RECIPROCATING ENGINES.
APPLICATION FILED DEC. 30, 1919.

1,342,648.

Patented June 8, 1920.
8 SHEETS—SHEET 6.

H. R. RICARDO.
BALANCING OF RECIPROCATING ENGINES.
APPLICATION FILED DEC. 30, 1919.

1,342,648.

Patented June 8, 1920.
8 SHEETS—SHEET 7.

Inventor.
H. R. Ricardo,
By Foster, Freeman, Watson & Co.
Attorneys.

H. R. RICARDO.
BALANCING OF RECIPROCATING ENGINES.
APPLICATION FILED DEC. 30, 1919.

1,342,648.

Patented June 8, 1920.
8 SHEETS—SHEET 8.

Inventor.
H. R. Ricardo,
By Foster, Freeman, Watson & Coit,
Attorneys

UNITED STATES PATENT OFFICE.

HARRY RALPH RICARDO, OF LONDON, ENGLAND.

BALANCING OF RECIPROCATING ENGINES.

1,342,648. Specification of Letters Patent. Patented June 8, 1920.

Application filed December 30, 1919. Serial No. 348,460.

*To all whom it may concern:*

Be it known that I, HARRY RALPH RICARDO, a subject of the King of England, and residing at London, in England, have invented certain new and useful Improvements in the Balancing of Reciprocating Engines, of which the following is a specification.

This invention relates to the balancing of internal combustion engines operating on the four-stroke cycle and has for its object to balance the secondary disturbing forces and in so doing to avoid the use of parts which rotate at a speed in excess of that of the crank shaft.

The secondary disturbing forces are particularly troublesome in engines of this type in which the cranks are positioned at 180° to one another since the common center of gravity of the whole of the reciprocating masses is simultaneously displaced owing to the angularity of the connecting rods. Some attempt has been made to counteract the disturbance due to this displacement by the use of two oppositely rotating balance weights but since the displacement occurs twice in every revolution of the crank shaft it is necessary to rotate the balance weights at twice the speed of the crank shaft. This involves the introduction of gearing and in high speed engines the peripheral speed of the gearing becomes excessive as also the loading on the bearings of the balance weights due to centrifugal force.

According to this invention the balancing is effected by one or more non-rotating balance weights and the weight or weights is or are vibrated about their mean position twice in every revolution of the crank shaft by one or more eccentrics operating in combination with toggle motion. Thus one or more masses are oscillated or reciprocated by movement imparted to them directly from the crank shaft through eccentrics the mass or masses being so positioned that their common center of gravity lies on a line which passes through the center of gravity of the primary reciprocating parts and of the crank shaft of the engine. Preferably two or a multiple of two masses are used and the masses forming each pair are caused to oscillate or reciprocate oppositely by means of toggle mechanism actuated by one or more eccentrics. By employing toggle mechanism it is possible to eliminate the horizontal component of the inertia forces set up by the movements of the balance weights.

The invention may be carried out in practice in various ways but the accompanying drawings illustrate several examples of constructions that may be adopted. In these drawings:—

Fig. 4 is a sectional elevation of an alternative arrangement employing two oscillating masses adapted for use with a four cylinder engine.

Fig. 5 is a sectional plan on the line 5—5 of Fig. 4.

Fig. 8 is a sectional elevation of another construction in which two masses are employed which are oscillated by a single eccentric.

Fig. 9 is a vertical section through the crank shaft on the line 9—9 of Fig. 8.

Like letters indicate like parts throughout the drawings.

Referring to the construction shown in

Figure 1:
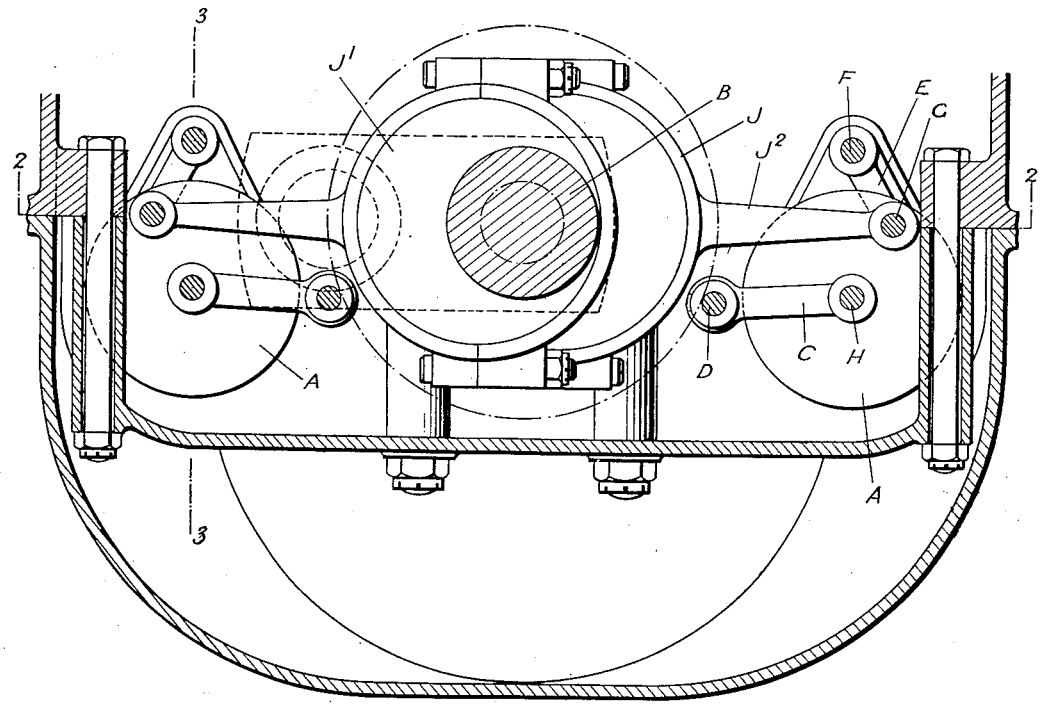
Figure 1 is a sectional elevation through the crank shaft of an engine illustrating an arrangement of two oscillating masses by which the secondary forces are balanced.
Figure 2:
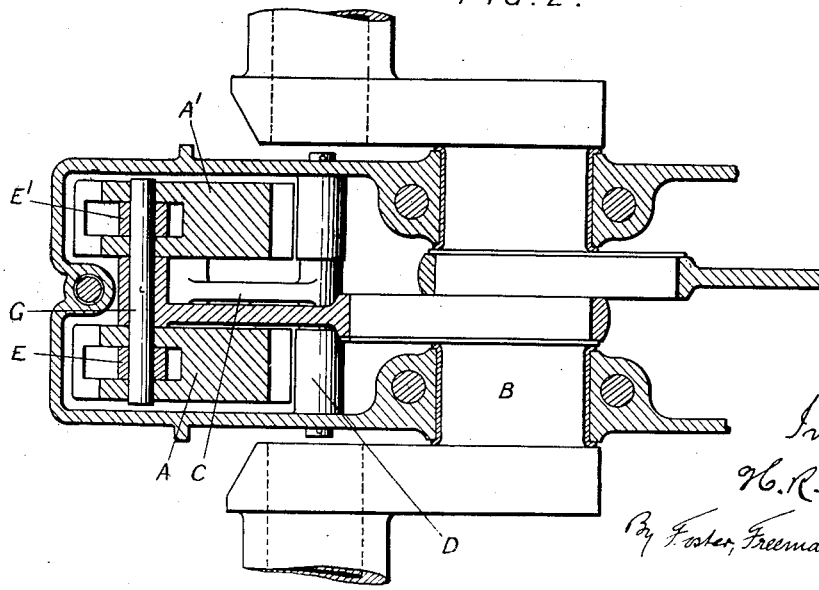
Fig. 2 is a sectional plan on the line 2—2 of Fig. 1.
Figure 3:
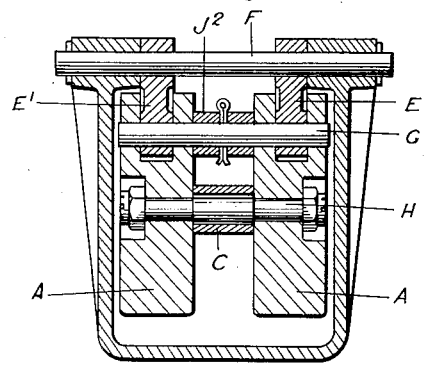
Fig. 3 is a section on the line 3—3 of Fig. 1.
Figure 6:
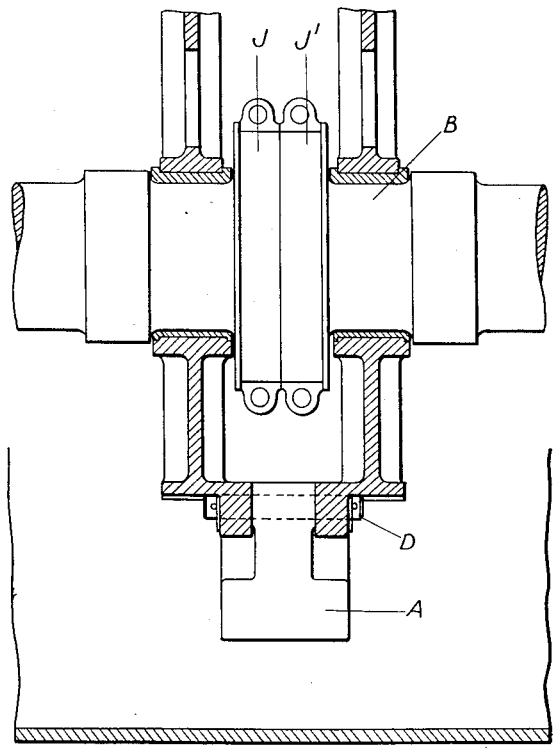
Fig. 6 is a vertical section through the crank shaft on the line 6—6 in Fig. 4.
Figure 7:
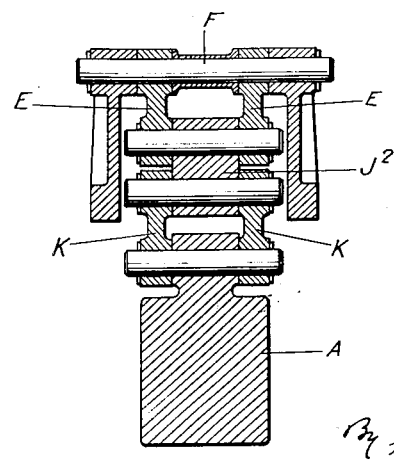
Fig. 7 is a section through the broken line 7—7 in Fig. 4.
Figure 10:
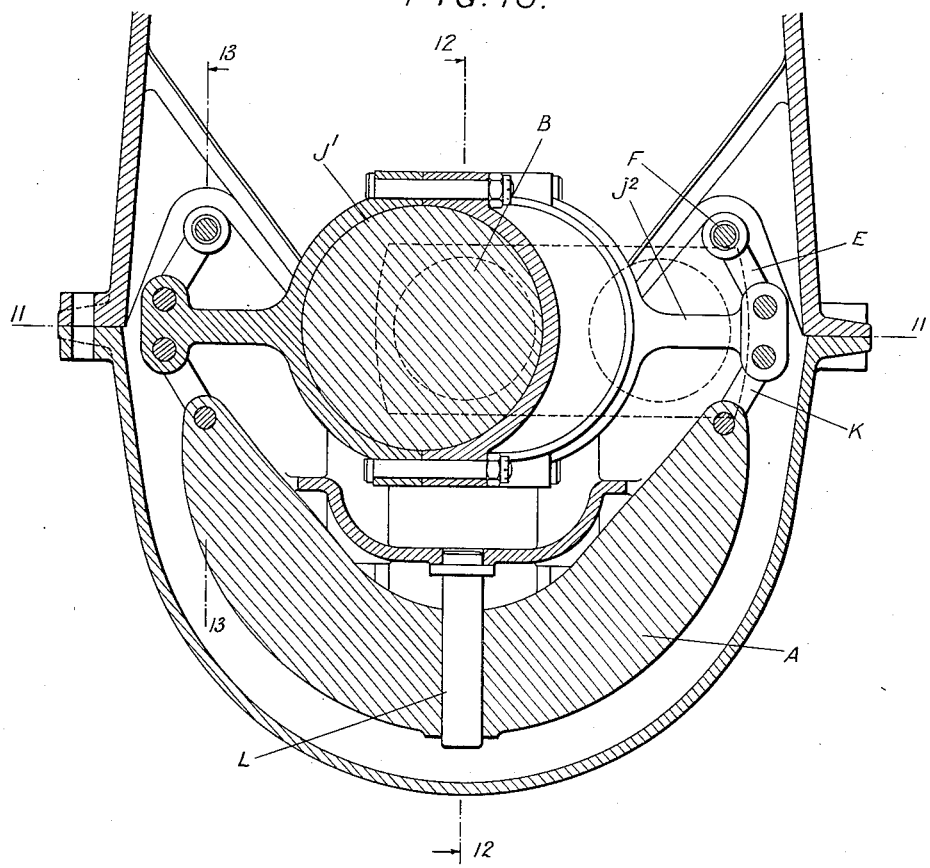
Fig. 10 is a sectional elevation of yet another construction in which a single centrally disposed weight is employed and movement is imparted thereto by two eccentrics, this arrangement being adapted for use with a four cylinder engine.
Figure 11:
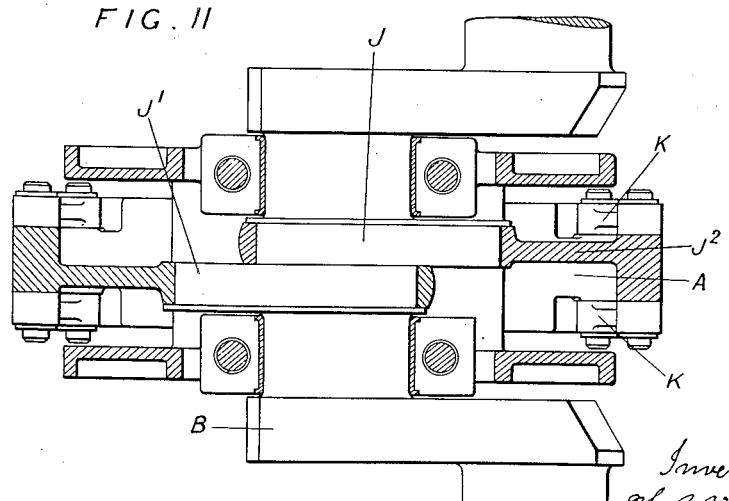
Fig. 11 is a sectional plan on the line 11—11 in Fig. 10.
Figure 12:
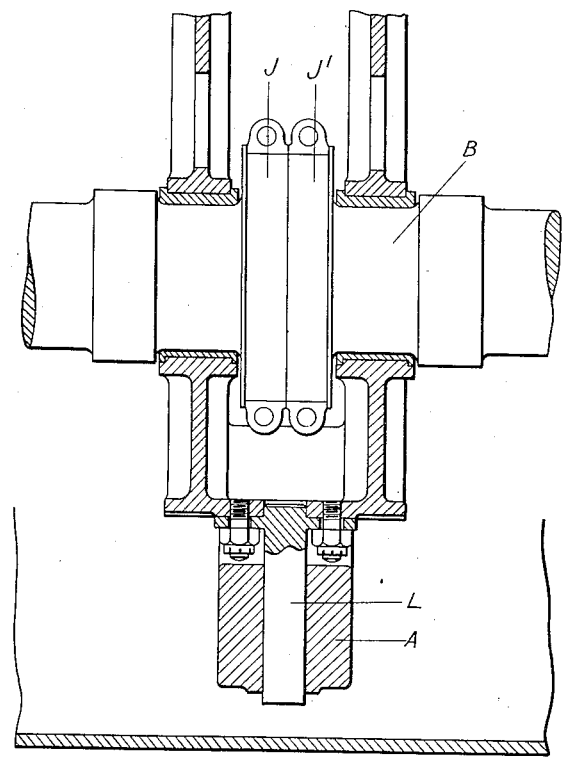
Fig. 12 is a vertical section on the line 12—12 in Fig. 10 looking in the direction of the arrows.
Figure 13:
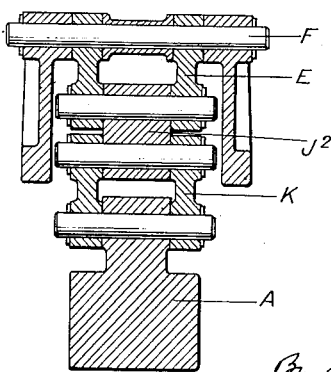
Fig. 13 is a section on the broken line 13—13 in Fig. 10.

Figs. 1, 2 and 3, two similar masses A are disposed on opposite sides of the crank shaft B and equidistant from the axis of this shaft and each mass is connected by a pivoted link C to some adjacent fixed part as at D. The links C are arranged to extend inwardly from the weights A toward the crank shaft B. Each weight A is also suspended by a second pivoted link E which extends from some fixed part as at F above the weight A down to a point G in this weight which is positioned a suitable distance from the point H at which the first link C is connected to the weight. Two eccentrics J and J' are provided and arranged side by side on the crank shaft B with equal but opposite throws and each eccentric is connected by a rod $J^2$ to a weight A at the point G where the second suspension link E is connected thereto. Thus this link E and the part of the weight between the points G and H where this link and the link C are connected to the weight form a toggle with the eccentric acting through its rod $J^2$ on the center joint of the toggle. Hence as the crank shaft B rotates the movement imparted to each weight A by the corresponding eccentric J and J' will be a double oscillatory one as the weight will turn about its point of connection H with the first suspension link C and will also swing with the link E about the fixed point F to which the latter is pivoted. The weights A and the linkages C and E may be arranged in various ways. Conveniently each weight is formed as a pair of twin masses A A' as shown in Fig. 2 with the distance link C which is single and lies between the pair of weights extending from a pin H which runs through both weights to the fixed point D which is disposed near the crank shaft B. The second or suspension link E is formed double as at E E' in Fig. 3 each part lying in the plane of a weight A or A' and both links are pivoted to the weights by the pin G which extends between the weights. To the part of this pin G which lies between the weights A A' is connected the eccentric rod $J^2$.

Referring to the construction shown in Figs. 4 to 7 each weight A is formed with a lug which is pivoted as at D to a fixed part below the crank shaft B and the weights as shown in Fig. 4 extends upwardly on either side of the crank shaft. Two eccentrics J J' are provided and the eccentric rods $J^2$ are directed oppositely and laterally. The end of each eccentric rod is connected by a short link E to some fixed part and the eccentric rod is also coupled by a second short link K to the adjacent portion of a weight A. These links E and K form toggles and the movements imparted to the weights A are oscillatory about the fixed points D. The relative dispositions of the parts are clearly shown in the figures.

In the construction illustrated in Figs. 8 and 9 a single eccentric J is employed and its rod $J^2$ is directed downwardly between the weights A each of which is pivoted as at D to a fixed part somewhat to one side of and below the crank shaft B. The eccentric rod $J^2$ is directly coupled to one of the weights A by a pivoted link $J^3$ which extends from the other weight to a pin $J^4$ in a lug formed on one side of the eccentric rod $J^2$ near the eccentric strap as clearly shown in Fig. 8. The weights here oscillate outward and inward about the fixed points D.

In the construction shown in Figs. 10 to 13 only a single weight A is employed and this is disposed beneath the crank shaft B and is crescent-shaped so that the ends thereof extend upwardly toward the sides of the shaft. Through the center portion of the weight passes a fixed vertical guide pin L on which the weight A reciprocates. Two eccentrics J J' are provided with their rods $J^2$ extending laterally and oppositely. The end of each eccentric rod is suspended from a fixed point F above it by a short link E and the rod is also coupled by a link K to the adjacent lateral part of the weight A. The eccentrics J J' have equal and opposite throws and as the crank shaft rotates the weight A is caused to rise and fall on the pin L.

Figure 16:
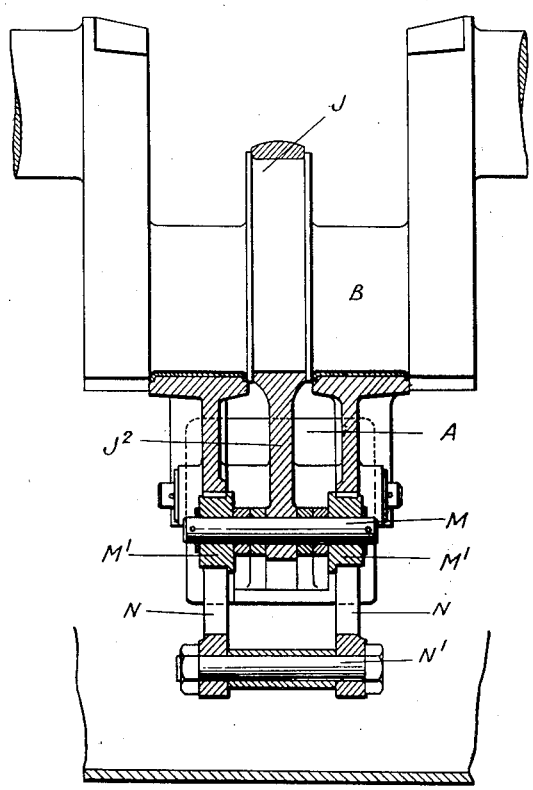
Fig. 16 is a vertical section on the line 16—16 in Fig. 14.
Figure 14:
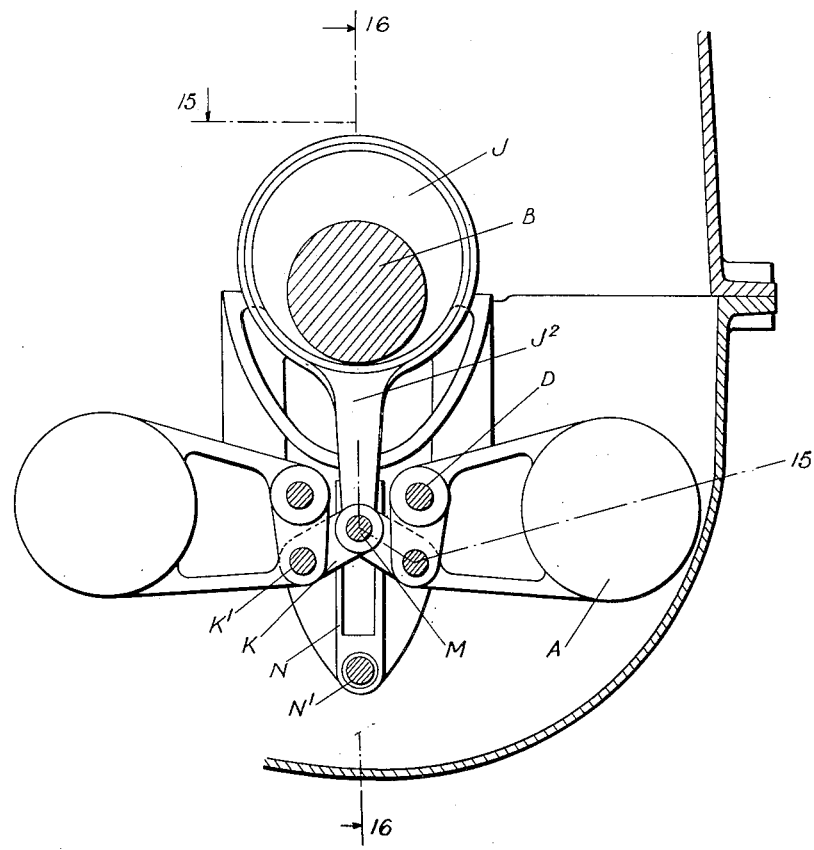
Fig. 14 is a sectional elevation of yet another construction in which two weights are employed and oscillated by means of a single eccentric operating through a single toggle.
Figure 15:
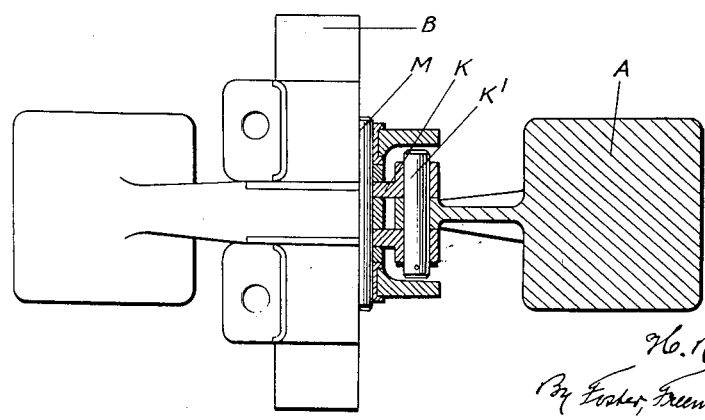
Fig. 15 is a part sectional plan on the broken line 15—15 in Fig. 14.

Referring to the construction shown in Figs. 14, 15 and 16 a single eccentric J is here employed with twin weights A disposed laterally with relation to the crank shaft B but below it. The eccentric rod $J^2$ extends downwardly and a pin M through the end thereof carries a pair of blocks M' which can reciprocate in a pair of slotted guide links N which are pivoted at one end at N' to some fixed part. The pin M is connected by links K to pins K' on the weights A and above these pivot points K' the weights are pivoted at D to some fixed part. As the crank shaft rotates the toggle action of the linkage causes oscillation of the weights A.

In each case the details of construction may be modified to meet requirements and the type of engine to which the invention is applied.

What I claim as my invention and desire to secure by Letters Patent is:—

1. In mechanism for balancing the secondary forces in an internal combustion engine operating on the four-stroke cycle the combination of balancing means, toggle mechanism, and mechanism actuated by the engine crank shaft and operating through the toggle mechanism to vibrate the balancing means twice in every revolution of the crank shaft as set forth.

2. In mechanism for balancing the secondary forces in an internal combustion engine operating on the four-stroke cycle the combination of a plurality of balance weights, toggle mechanism, and means actuated by the engine crank shaft and operating through the toggle mechanisms to vibrate the balance weights about their mean positions twice in every revolution of the crank shaft as set forth.

3. In mechanism for balancing the secondary forces in an internal combustion engine operating on the four-stroke cycle the combination of a balancing means, toggle mechanism, and eccentric mechanism actuated by the engine crank shaft and operating through the toggle mechanism to vibrate the balancing means twice in every revolution of the crank shaft as set forth.

4. In mechanism for balancing the secondary forces in an internal combustion engine operating on the four-stroke cycle the combination of a plurality of balance weights, toggle mechanisms, and eccentric means actuated by the engine crank shaft and operating through the toggle mechanisms to vibrate the balance weights about their mean positions twice in every revolution of the crank shaft as set forth.

5. In mechanism for balancing the secondary forces in an internal combustion engine operating on the four-stroke cycle the combination of a crank shaft with reciprocating parts connected thereto, a balancing means positioned so that the center of gravity thereof lies on a line which passes through the center of gravity of the primary and reciprocating parts and of the crank shaft, toggle mechanism, and mechanism actuated by the engine crank shaft and operating through the toggle mechanism to vibrate the balancing means about the mean position thereof twice in every revolution of the crank shaft as set forth.

6. In mechanism for balancing the secondary forces in an internal combustion engine operating on the four-stroke cycle the combination of a crank shaft with reciprocating parts connected thereto, two balance weights, toggle mechanisms, and means actuated by the engine crank shaft and operating through the toggle mechanisms to vibrate the balance weights about their mean positions twice in every revolution of the crank shaft as set forth.

7. In mechanism for balancing the secondary forces in an internal combustion engine operating on the four-stroke cycle the combination of a crank shaft, an eccentric on this crank shaft, two weights pivotally mounted and symmetrically disposed on either side of a vertical line passing centrally through this crank shaft, and toggle mechanisms actuated by the eccentric and operating to vibrate the balance weights twice in every revolution of the crank shaft as set forth.

8. In mechanism for balancing the secondary forces in an internal combustion engine operating on the four-stroke cycle the combination of a crank shaft with reciprocating parts connected thereto, an eccentric on this crank shaft, two balance weights pivotally mounted and positioned so that the common center of gravity of these weights lies on a line which passes through the center of gravity of the primary and reciprocating parts and of the crank shaft, an eccentric rod, and toggle mechanisms connected to the eccentric rod and to the balance weights and operative to vibrate these weights about their mean positions twice in every revolution of the crank shaft as set forth.

In testimony whereof I have signed my name to this specification.

HARRY RALPH RICARDO.